United States Patent
Dyson et al.

(10) Patent No.: US 11,255,544 B2
(45) Date of Patent: Feb. 22, 2022

(54) ROTATING DETONATION COMBUSTION AND HEAT EXCHANGER SYSTEM

(71) Applicant: General Electric Company, Schenectady, NY (US)

(72) Inventors: Thomas Earl Dyson, Niskayuna, NY (US); Thomas Michael Lavertu, Ballston Lake, NY (US); Sarah Marie Monahan, Latham, NY (US); Kapil Kumar Singh, Rexford, NY (US); Venkat Eswarlu Tangirala, Niskayuna, NY (US); Joel Meier Haynes, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 72 days.

(21) Appl. No.: 16/701,521

(22) Filed: Dec. 3, 2019

(65) Prior Publication Data

US 2021/0164660 A1    Jun. 3, 2021

(51) Int. Cl.
| | |
|---|---|
| *F02C 9/26* | (2006.01) |
| *F23R 7/00* | (2006.01) |
| *F02C 5/02* | (2006.01) |
| *F23R 3/28* | (2006.01) |
| *F02C 3/04* | (2006.01) |
| *F02C 7/22* | (2006.01) |
| *F23R 3/00* | (2006.01) |

(Continued)

(52) U.S. Cl.
CPC ............... *F23R 3/28* (2013.01); *F02C 3/04* (2013.01); *F02C 5/02* (2013.01); *F02C 7/22* (2013.01); *F02C 9/266* (2013.01); *F23R 3/005* (2013.01); *F23R 7/00* (2013.01); *F02C 7/224* (2013.01); *F02C 9/28* (2013.01)

(58) Field of Classification Search
CPC .... F23R 7/00; F23R 3/005; F23R 3/34; F23R 3/56; F02C 5/00; F02C 5/02; F02C 5/04; F02C 5/06; F02C 5/08; F02C 5/10; F02C 5/11; F02C 5/12; F02C 9/263; F02C 9/266; F02C 9/28; F02C 7/22; F02C 7/224; F02C 7/232; F02K 7/02; F02K 7/04; F02K 7/06; F02K 7/067; F02K 7/075; F02K 7/08
See application file for complete search history.

(56) References Cited

U.S. PATENT DOCUMENTS

| | | |
|---|---|---|
| 1,801,007 A | 4/1931 | Jezler |
| 3,727,409 A | 4/1973 | Kelley et al. |
| 3,925,002 A | 12/1975 | Verdouw |

(Continued)

FOREIGN PATENT DOCUMENTS

GB          392444 A       5/1933

*Primary Examiner* — William H Rodriguez
(74) *Attorney, Agent, or Firm* — Venable LLP; Elizabeth C. G. Gitlin; Michele V. Frank

(57) ABSTRACT

A rotating detonation combustion (RDC) system is provided. The RDC includes a first outer wall and a second outer wall each extended around a centerline axis, and a detonation chamber formed radially inward of the second outer wall. A fuel passage extended between the first outer wall and the second outer wall, the fuel passage including a first inlet opening proximate to the aft end through which a flow of fuel is received into the fuel passage. The flow of fuel is provided through the fuel passage from the aft end to the forward end of the RDC system and to the detonation chamber.

15 Claims, 6 Drawing Sheets

(51) Int. Cl.
*F02C 7/224* (2006.01)
*F02C 9/28* (2006.01)

(56) References Cited

U.S. PATENT DOCUMENTS

| | | | |
|---|---|---|---|
| 5,513,489 A | 5/1996 | Bussing | |
| 5,901,550 A | 5/1999 | Bussing et al. | |
| 6,062,018 A | 5/2000 | Bussing | |
| 6,347,509 B1 | 2/2002 | Kaemming et al. | |
| 6,931,858 B2 | 8/2005 | Venkataramani et al. | |
| 7,784,267 B2 | 8/2010 | Tobita et al. | |
| 9,512,805 B2 | 12/2016 | Snyder | |
| 9,556,794 B2 | 1/2017 | Falempin et al. | |
| 9,599,065 B2 | 3/2017 | Faletnpin | |
| 9,732,670 B2 | 8/2017 | Joshi et al. | |
| 2004/0000134 A1 | 1/2004 | Tew et al. | |
| 2006/0053801 A1* | 3/2006 | Orlando | F02K 3/06 60/772 |
| 2007/0180810 A1* | 8/2007 | Chapin | F23C 15/00 60/39.76 |
| 2008/0141972 A1 | 6/2008 | Morrison et al. | |
| 2008/0229751 A1 | 9/2008 | Orlando et al. | |
| 2009/0193786 A1* | 8/2009 | Murrow | F02C 3/16 60/39.78 |
| 2009/0196733 A1* | 8/2009 | Murrow | F02K 3/06 415/73 |
| 2012/0131899 A1* | 5/2012 | Brumberg | F23R 7/00 60/39.76 |
| 2014/0196460 A1 | 7/2014 | Falempin et al. | |
| 2015/0167544 A1* | 6/2015 | Joshi | F02B 53/04 123/205 |
| 2018/0073478 A1 | 3/2018 | Noguchi | |
| 2018/0179952 A1 | 6/2018 | Peter et al. | |
| 2018/0180289 A1* | 6/2018 | Lavertu, Jr. | F23R 3/56 |
| 2018/0356096 A1 | 12/2018 | Pal et al. | |
| 2020/0132020 A1* | 4/2020 | Wickersham | F02C 3/16 |
| 2020/0191398 A1* | 6/2020 | Rathay | B64C 23/04 |
| 2020/0191399 A1* | 6/2020 | Rathay | F02C 5/02 |
| 2020/0248905 A1* | 8/2020 | Singh | F23R 3/286 |
| 2020/0248906 A1* | 8/2020 | Singh | F23R 7/00 |
| 2020/0386189 A1* | 12/2020 | Powell | F02C 7/224 |

\* cited by examiner

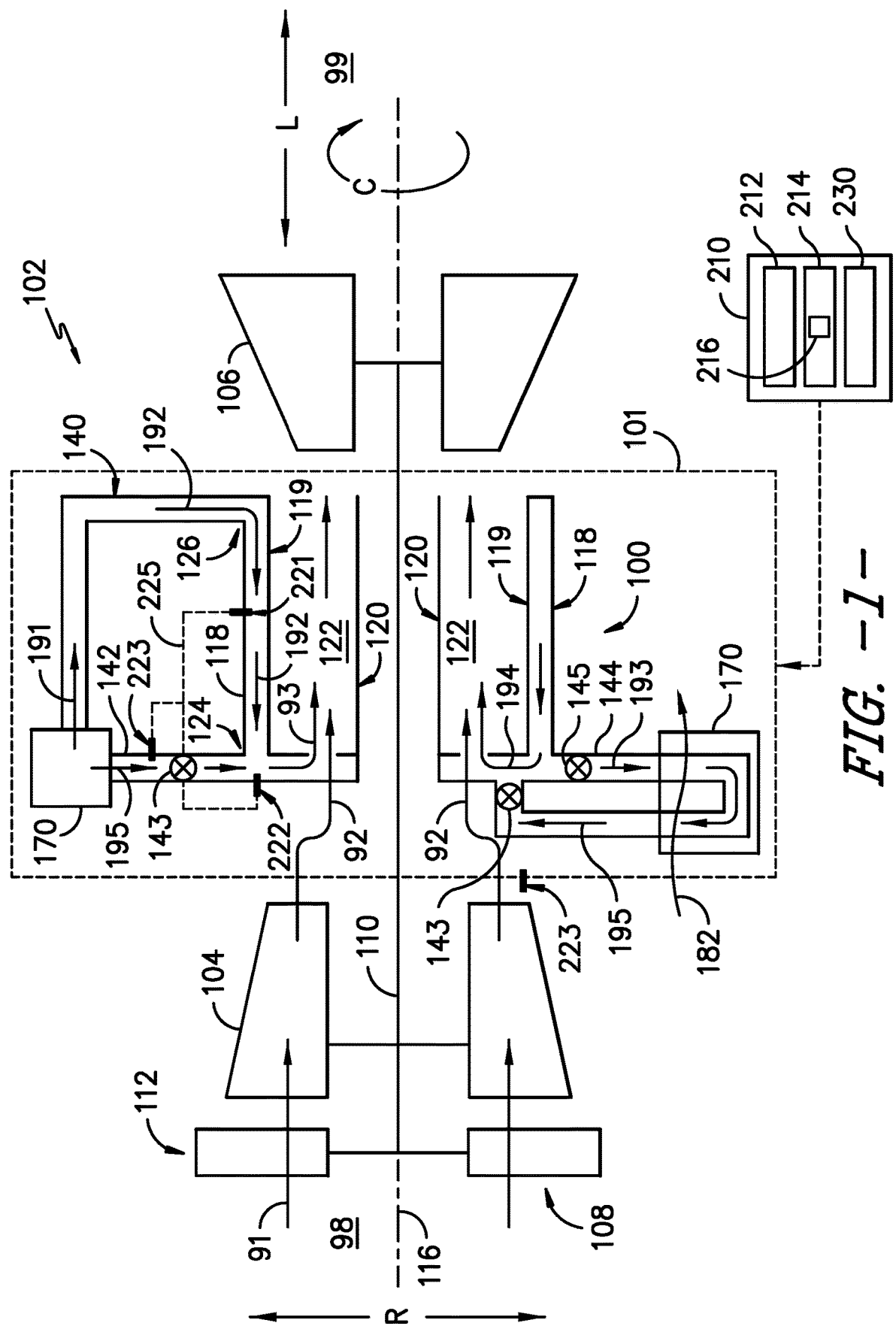
FIG. -1-

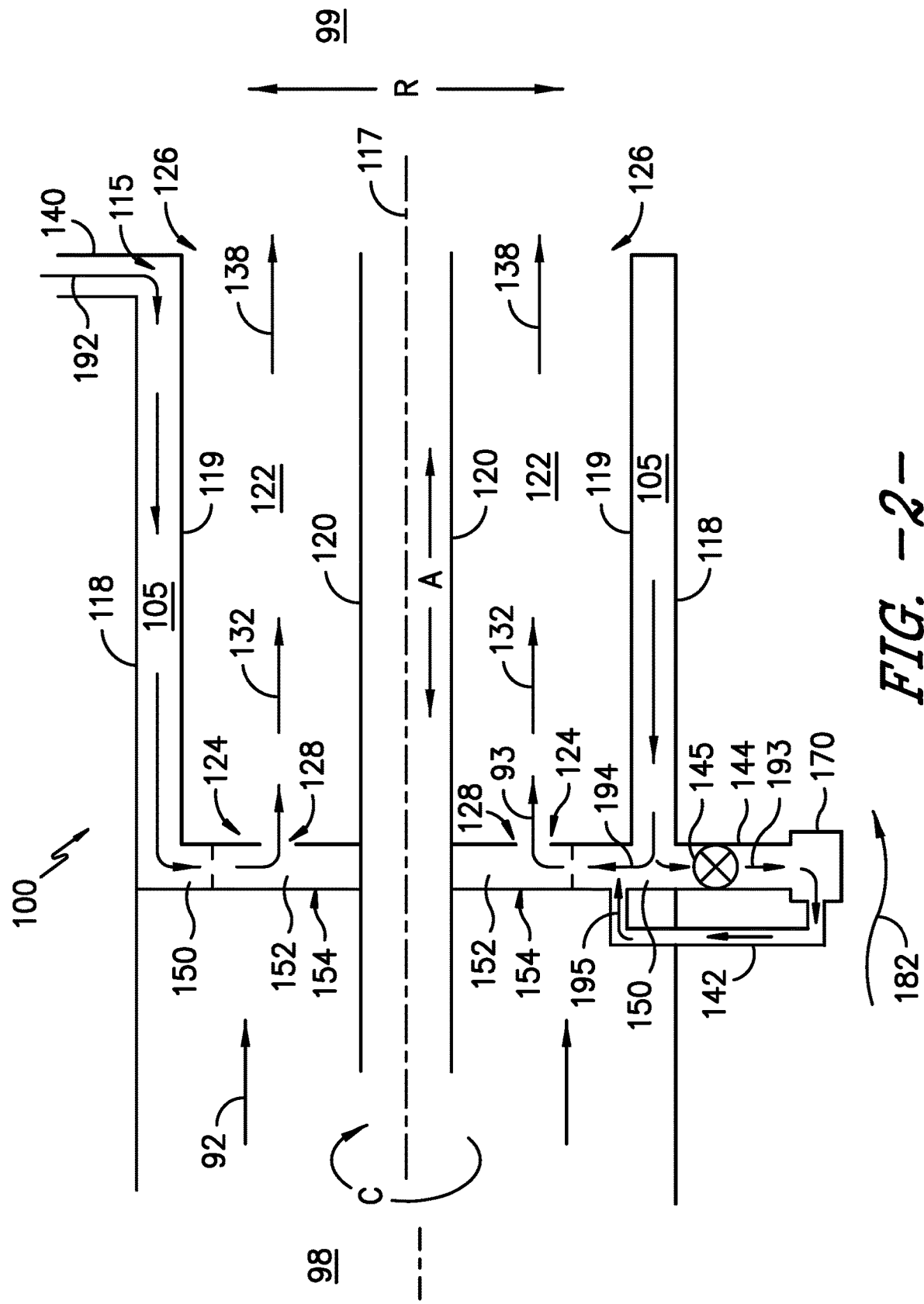
FIG. -2-

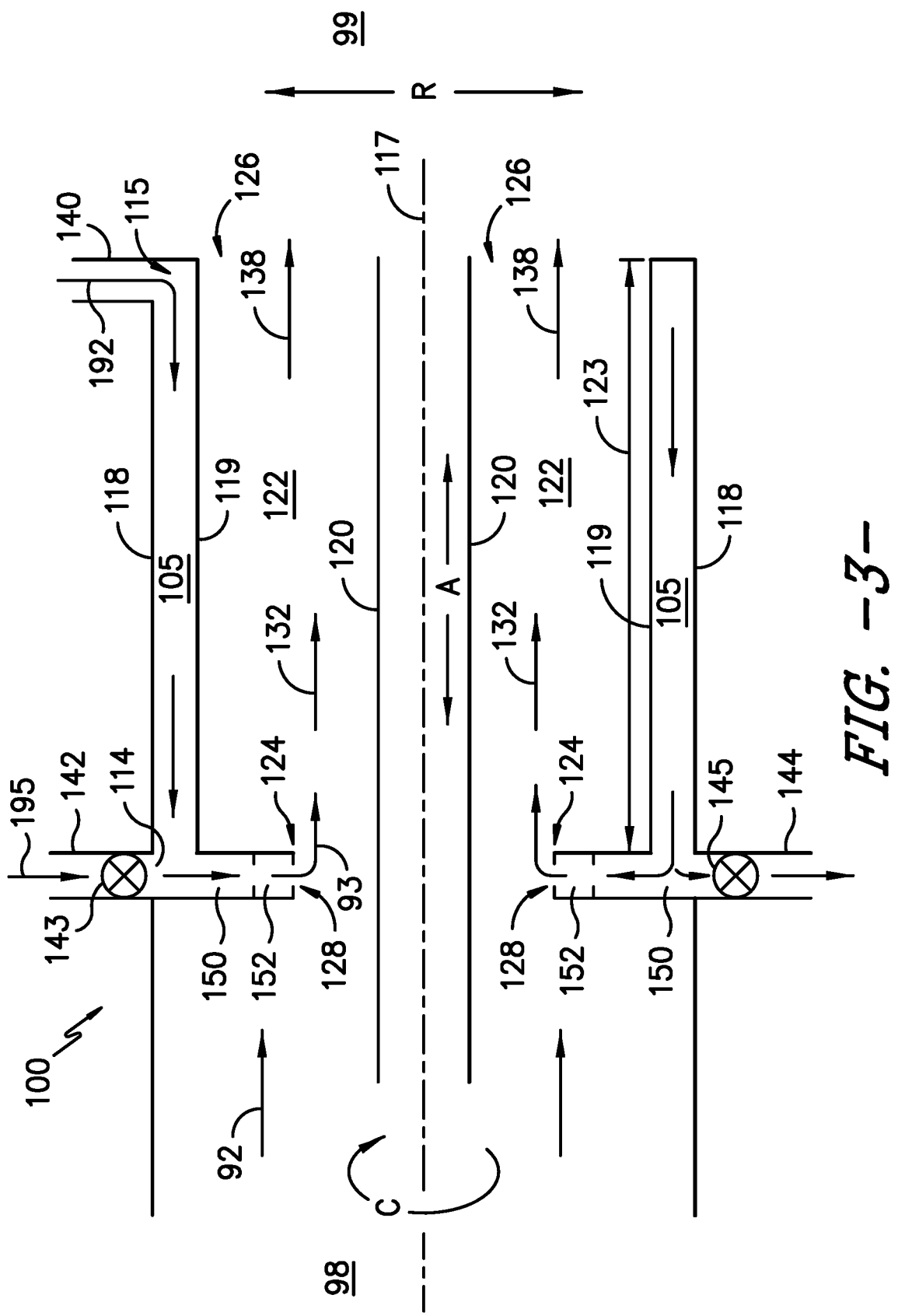
FIG. -3-

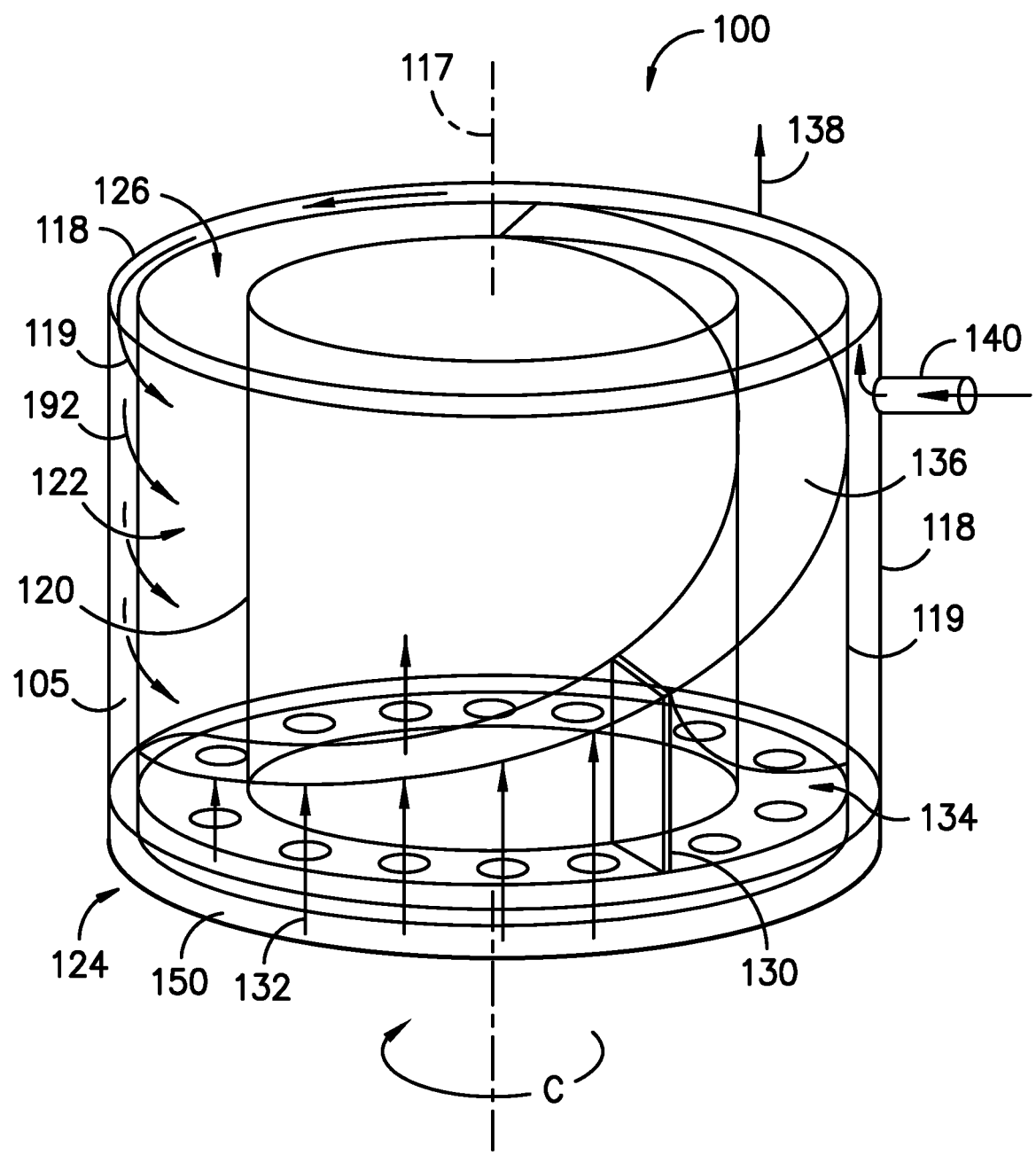
FIG. -4-

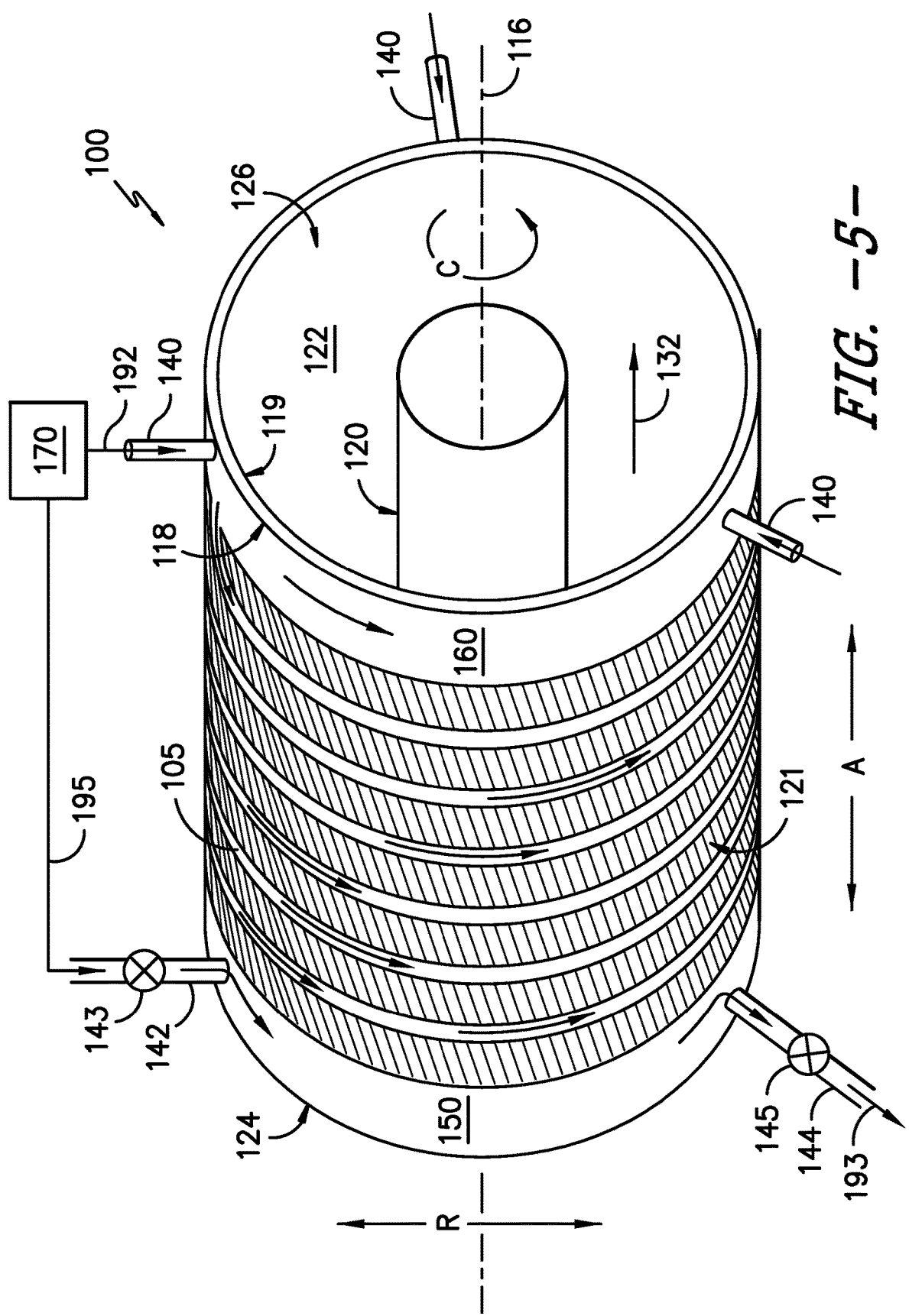

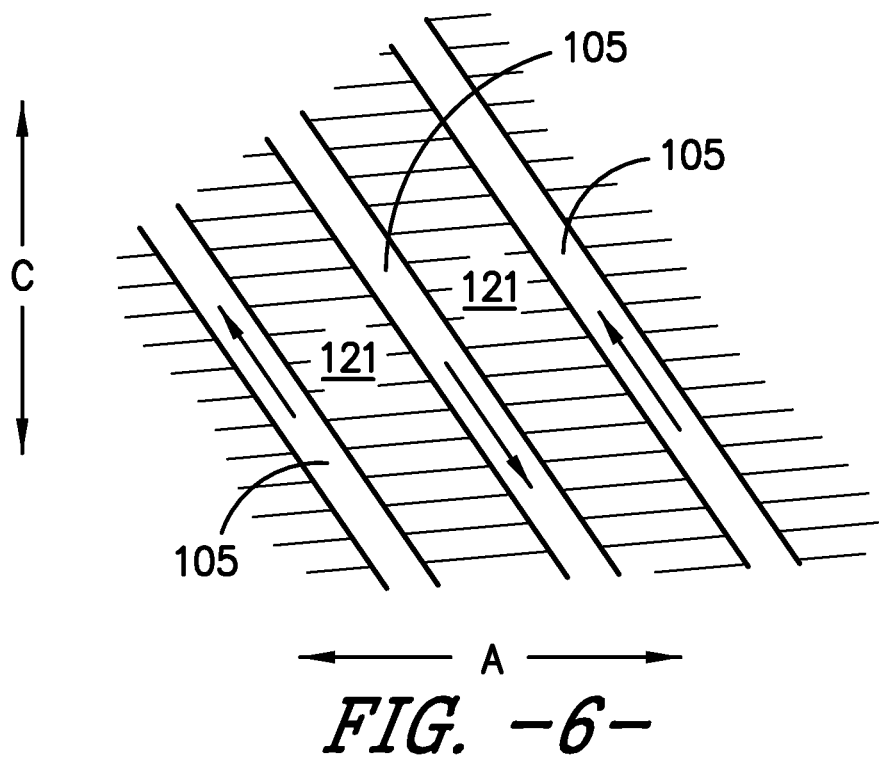
FIG. -6-
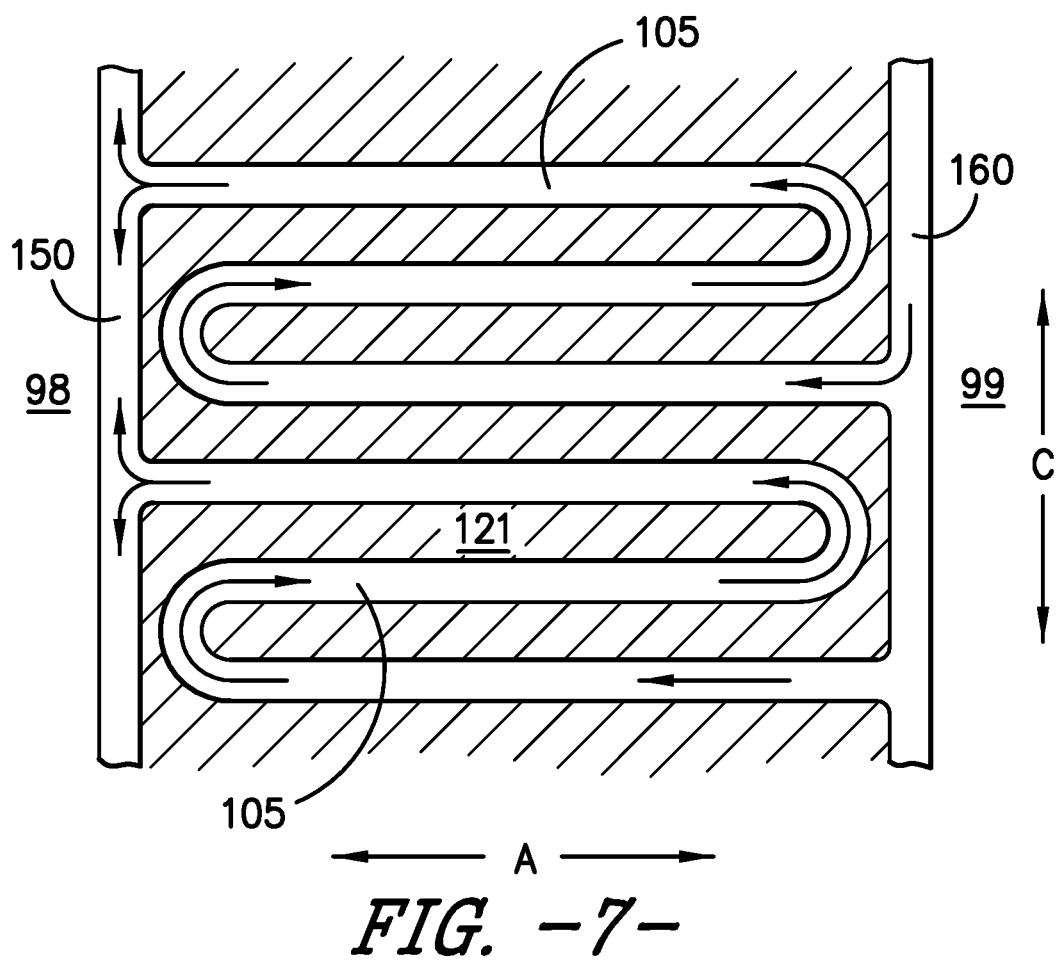
FIG. -7-

ROTATING DETONATION COMBUSTION AND HEAT EXCHANGER SYSTEM

FIELD

The present subject matter relates generally to a system of continuous detonation in a propulsion system.

BACKGROUND

Many propulsion systems, such as gas turbine engines, are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such propulsion systems generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are welcomed nonetheless.

Accordingly, improvements in engine efficiency have been sought by modifying the engine architecture such that the combustion occurs as a detonation in a continuous mode. High energy ignition detonates a fuel/air mixture that transitions into a detonation wave (i.e., a fast moving shock wave closely coupled to the reaction zone). The detonation wave travels in a Mach number range greater than the speed of sound with respect to the speed of sound of the reactants. The products of combustion follow the detonation wave at the speed of sound relative to the detonation wave and at significantly elevated pressure. Such combustion products may then exit through a nozzle to produce thrust or rotate a turbine.

However, detonation combustion produces extremely high heat loads relative to deflagrative combustion. Additionally, detonation combustion generally requires higher fuel temperatures for detonation relative to deflagrative combustion. As such, there is a need for systems to attenuate deleterious effects of high heat loads at detonation combustion systems in contrast to deflagrative combustion systems.

BRIEF DESCRIPTION

Aspects and advantages of the invention will be set forth in part in the following description, or may be obvious from the description, or may be learned through practice of the invention.

An aspect to the present disclosure is directed to a rotating detonation combustion (RDC) system, the system defining an aft end at which detonation gases exit and a forward end at which a flow of oxidizer enters, the RDC system including a first outer wall and a second outer wall each extended around a centerline axis, a detonation chamber formed radially inward of the second outer wall, and a fuel passage extended between the first outer wall and the second outer wall. The fuel passage includes a first inlet opening proximate to the aft end through which a flow of fuel is received into the fuel passage, and the flow of fuel is provided through the fuel passage from the aft end to the forward end of the RDC system.

Another aspect of the present disclosure is directed to a heat engine including a compressor section configured to provide a flow of oxidizer to a rotating detonation combustion (RDC) system, in which the RDC system includes an aft end at which detonation gases exit a detonation chamber and a forward end at which the flow of oxidizer enters the detonation chamber. The RDC system includes a first outer wall and a second outer wall each extended around a centerline axis. The detonation chamber is formed radially inward of the second outer wall. A fuel passage is extended between the first outer wall and the second outer wall. The fuel passage includes a first inlet opening proximate to the aft end through which a flow of fuel is received into the fuel passage. The flow of fuel is provided through the fuel passage from the aft end to the forward end of the RDC system. A fuel injector is positioned at the forward end of the RDC system in fluid communication with the fuel passage and the detonation chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a heat engine including a rotating detonation combustion system in accordance with an exemplary embodiment of the present disclosure;

FIG. 2 is a schematic view of an exemplary embodiment of a rotating detonation combustion system according to an aspect of the present disclosure;

FIG. 3 is a schematic view of another exemplary embodiment of a rotating detonation combustion system according to an aspect of the present disclosure;

FIG. 4 is a perspective view of a detonation chamber of an exemplary rotating detonation combustion system according to an aspect of the present disclosure;

FIG. 5 is a perspective view of an exemplary embodiment of a rotating detonation combustion system according to an aspect of the present disclosure;

FIG. 6 is an exemplary embodiment of a portion of an exemplary embodiment of a rotating detonation combustion assembly and heat exchanger according to an aspect of the present disclosure;

FIG. 7 is an exemplary embodiment of a portion of another exemplary embodiment of a rotating detonation combustion assembly and heat exchanger according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "forward" and "aft" refer to relative positions within a propulsion system or vehicle, and refer to the normal operational attitude of the propulsion system or vehicle. For example, with regard to a propulsion system, forward refers to a position closer to a propulsion system inlet and aft refers to a position closer to a propulsion system nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Embodiments of systems for rotating detonation combustion are provided herein. The embodiments provided herein may attenuate thermal stresses generated from high heat loads due to detonation combustion at a detonation chamber. The systems provided herein include detonation chamber liners including outer walls that define a fuel flow passage therethrough that provide the flow of fuel in thermal communication with the high heat loads generated at the detonation chamber. The flow of fuel is fluidly segregated from the detonation gases in the detonation chamber by the liner walls. The heated flow of fuel is then provided to a fuel injector, in which the heated fuel is mixed with compressed oxidizer (interchangeably referred to as air or oxidizer herein). The heated flow of fuel further conditions the fuel to provide an improved detonation wave at the detonation chamber.

Embodiments of the system provided herein may further include controllers, computer systems, computer-implemented methods, sensors, valves, or heat exchangers configured to desirably control fuel characteristics (e.g., fuel flow rate, pressure, temperature, viscosity, density, etc.) of the one or more flows of fuel based on desired heat transfer and/or operating conditions at the detonation chamber. As such, embodiments of the system provided herein may provide both a system for attenuating thermal stresses at rotating detonation combustion structures, such as outer walls defining a detonation chamber, and systems for improving detonation combustion quality, such as detonation cell size and/or quantity, such as to provide a desirably sustained detonation wave at the detonation chamber.

Referring now to FIG. 1, a schematic view of an exemplary embodiment of a heat engine 102 including an embodiment of a rotating detonation combustion (RDC) system 100 is provided. The heat engine 102 is generally configured as a propulsion system, power generation system, or turbo machine. More specifically, the heat engine 102 generally includes an inlet or compressor section 104 and an outlet or turbine section 106. In various embodiments, the RDC system 100 is positioned downstream of the compressor section 104. In some embodiments, such as depicted in regard to FIG. 1, the RDC system 100 is positioned upstream of the turbine section 106. During operation, airflow 91 may be provided to an inlet 108 of the compressor section 104, wherein such airflow 91 is compressed through one or more compressors, each of which may include one or more alternating stages of compressor rotor blades and compressor stator vanes. However, in various embodiments, the compressor section 104 may define a nozzle through which the airflow 91 is compressed as it flows to the RDC system 100. Such embodiments may include ramjet or scramjet applications, such that compression of the airflow 91 may be based at least in part on the speed of the airflow 91 entering the inlet or compressor section 104 of the engine 102.

As will be discussed in greater detail below, compressed air 92 from the compressor section 104 may then be provided to the RDC system 100, wherein the compressed air 92 may be mixed with a liquid and/or gaseous fuel 93 and detonated in a detonation chamber 122 to generate combustion products 132 (FIGS. 2-3). The combustion products 132 may then flow to the outlet or turbine section 106 wherein one or more turbines may extract kinetic/rotational energy from the combustion products. As with the compressor(s) within the compressor section 104, each of the turbine(s) within the turbine section 106 may include one or more alternating stages of turbine rotor blades and turbine stator vanes. However, in various embodiments, the turbine section 106 may define an expansion section through which detonation gases 132 are expanded and provide propulsive thrust from the RDC system 100. Such embodiments may include ramjet or scramjet applications. In still various embodiments, the combustion gases or products 132 may then flow from the turbine section 106 through, e.g., an exhaust nozzle to generate thrust for the heat engine 102.

As will be appreciated, in certain embodiments of the engine 102 defining a turbo machine, rotation of the turbine(s) within the turbine section 106, generated by the combustion products 132, is transferred through one or more shafts or spools 110 to drive the compressor(s) within the compressor section 104. In various embodiments, the compressor section 104 may further define a propeller or fan section 112, such as for a turbofan, turboprop, or propfan engine configuration, such as to propel air across a bypass flowpath outside of the RDC system 100 and turbine section 106.

It will be appreciated that the heat engine 102 depicted schematically in FIG. 1 is provided by way of example only. In certain exemplary embodiments, the heat engine 102 may include any suitable number of compressors within the compressor section 104, any suitable number of turbines within the turbine section 106, and further may include any number of shafts or spools 110 appropriate for mechanically linking the compressor(s), turbine(s), and/or fans. Similarly, in other exemplary embodiments, the heat engine 102 may include any suitable fan section, with a fan thereof being driven by the turbine section 106 in any suitable manner. For example, in certain embodiments, the fan may be directly linked to a turbine within the turbine section 106, or alternatively, may be driven by a turbine within the turbine section 106 across a power gearbox. Additionally, the propeller or fan section 112 may be a variable pitch fan, a fixed pitch fan, a ducted fan (i.e., the heat engine 102 may include an outer nacelle surrounding the fan section), an un-ducted fan or propfan, or may have any other suitable configuration.

Moreover, it should also be appreciated that the RDC system 100 may further be incorporated into any other suitable aeronautical propulsion system, such as a supersonic propulsion system, a hypersonic propulsion system, a turbofan engine, a turboshaft engine, a turboprop engine, a turbojet engine, a ramjet engine, a scramjet engine, etc., or combinations thereof, such as combined-cycle propulsion systems. Further, in certain embodiments, the RDC system 100 may be incorporated into a non-aeronautical power generation system, such as a land-based power-generating propulsion system, an aero-derivative propulsion system, auxiliary power unit, etc. Further, still, in certain embodiments, the RDC system 100 may be incorporated into any other suitable power generation system, propulsion system, or vehicle, such as a manned or unmanned aircraft, a rocket, a missile, a launch vehicle, etc. With one or more of the latter embodiments, the propulsion system may not include a compressor section 104 or a turbine section 106, and instead may simply include a convergent and/or divergent flowpath leading to and from, respectively, the RDC system 100. For example, the turbine section 106 may generally define the nozzle through which the combustion products 132 flowing therethrough generate thrust.

Referring still to FIG. 1, the engine 102 includes a fuel system 170 configured to provide a flow of liquid and/or gaseous fuel 191 to the detonation chamber 122 of the RDC system 100. The fuel system 170 generally includes a fuel storage unit. Embodiments of the fuel system 170 may further include heat exchangers, oxygen reduction units or a de-oxygenation device, valves or other control mechanisms for adjusting a rate of fuel flow, or dampers. The engine 102 further includes a fuel manifold 140. The fuel manifold 140 is configured to provide a flow of fuel, shown schematically via arrows 192, from the fuel system 170 to the RDC system 100, such as further shown and described in regard to FIGS. 2-3.

Referring now to FIGS. 2-3, side, schematic views are provided of embodiments of the RDC system 100 as may be incorporated into the exemplary embodiment of the heat engine 102 shown and described in regard to FIG. 1. As shown, the RDC system 100 generally defines a longitudinal centerline axis 116 that may be common to the heat engine 102, a radial direction R relative to the longitudinal centerline axis 116, and a circumferential direction C relative to the longitudinal centerline axis 116 (see, e.g., FIG. 4), and a longitudinal direction L. The RDC system 100 defines a forward end 98 and an aft end 99 with respect to the flow of detonation gases 132 through the RDC system 100. More particularly, the RDC system 100 may define the forward end 98 and the aft end 99 with respect to an increasing heat load of the detonation gases 132 as the detonation gases 132 flow toward the expansion or turbine section 106 of the engine 102. The forward end 98 may still particularly be defined as a first end proximate to which the compressed air 92 enters the RDC system 100, and the aft end 99 may still particularly be defined as a second end distal to the first end or proximate to which the detonation gases 132 exits the RDC system 100.

In various embodiments, the RDC system 100 includes a first outer wall 118, a second outer wall 119, and an inner wall 120 each extended along an axial direction A co-directional to an RDC centerline axis 117. The walls 118, 119, 120 are each extended circumferentially around the centerline axis 117 of the RDC system 100. It should be appreciated that in certain embodiments the centerline axis 117 is coaxial to the centerline axis 116 of the engine 102 depicted in regard to FIG. 1. In other embodiments, the centerline axis 117 defines an acute angle of the RDC system 100 relative to the centerline axis 116 of the engine 102, or such as to define one or more detonation or combustion cans, a plurality of which may be positioned at least partially circumferentially around the centerline axis 116. Additionally, or alternatively, the axial direction A depicted in regard to FIGS. 2-3 may be co-directional to the longitudinal direction L depicted in regard to FIG. 1. Furthermore, although the walls 118, 119, 120 are depicted as extending substantially along the axial direction A, it should be appreciated that one or more of the walls 118, 119, 120 may extend at least partially radially or curved relative to the centerline line axis 117.

A detonation chamber 122 is defined between the second outer wall 119 and the inner wall 120, at which fuel 93 and compressed air 92 are provided and detonated, such as further described herein. A fuel passage 105 is extended between the first outer wall 118 and the second outer wall 119 between the forward end 98 and the aft end 99 of the RDC system 100. In certain embodiments, the fuel passage 105 is extended at least partially co-directional to the first outer wall 118 and the second outer wall 119, such as along the axial direction A. The fuel passage 105 includes a first inlet opening 115 at or proximate to the aft end 99 of the outer walls 118, 119. In certain embodiments, the fuel passage 105 includes the first inlet opening 115 at the aft end 99 of the first outer wall 118 operably coupled to the fuel manifold 140 to receive a first flow of fuel 192 into the fuel passage 105 from the fuel system 170. The first flow of fuel 192 is provided through the fuel passage 105 from the aft end 99 to the forward end 98 of the RDC system 100.

Referring still to FIGS. 2-3, the first outer wall 118 and the second outer wall 119 together fluidly separate the first flow of fuel 192 from the detonation chamber 122. At the forward end 98 of the RDC system 100 (i.e., at an upstream end relative to the flow of compressed air 92 entering the RDC system 100, such as indicated at arrow 124), a fuel injector 152 including a fuel injector opening 128 is positioned in fluid communication with the fuel passage 105. The fuel injector 152 is operably coupled at or proximate to the forward end 98 of the fuel passage 105 to provide at least a portion of the flow of fuel 192 through the fuel injector opening 128 to the detonation chamber 122, such as shown schematically via arrows 93. In one embodiment, such as depicted in regard to FIG. 2, the fuel injector 152 is extended as one or more struts or vanes along the radial direction R and connected to the inner wall 120. In another embodiment, such as depicted in regard to FIG. 3, the fuel injector 152 is extended as one or more struts partially extended along the radial direction R. In regard to FIGS. 2-3, the fuel injector opening 128 may be configured to provide a substantially axial flow of fuel 93 to the detonation chamber 122. However, it should be appreciated that in still various embodiments, the fuel injector opening 128 may be configured to provide the flow of fuel 93 at least partially along the radial direction R, such as through the outer wall 119.

Referring briefly to FIG. 4, providing a perspective view of the detonation chamber 122 (without the fuel injector opening 128), it will be appreciated that the RDC system 100 generates the detonation wave 130 during operation. The detonation wave 130 travels in the circumferential direction C of the RDC system 100 consuming an incoming fuel/oxidizer mixture 132 and providing a high pressure region 134 within an expansion region 136 of the combustion. A burned fuel/oxidizer mixture 138 (i.e., detonation gases) exits the detonation chamber 122 and is exhausted.

More particularly, it will be appreciated that the RDC system 100 is of a detonation-type combustor, deriving energy from the continuous wave 130 of detonation. For a detonation combustor, such as the RDC system 100 disclosed herein, the combustion of the fuel/oxidizer mixture 132 is effectively a detonation as compared to a burning, as is typical in the traditional deflagration-type combustors. Accordingly, a main difference between deflagration and detonation is linked to the mechanism of flame propagation. In deflagration, the flame propagation is a function of the heat transfer from a reactive zone to the fresh mixture, generally through conduction. By contrast, with a detonation combustor, the detonation is a shock induced flame, which results in the coupling of a reaction zone and a shockwave. The shockwave compresses and heats the fresh mixture 132, increasing such mixture 132 above a self-ignition point. On the other side, energy released by the detonation contributes to the propagation of the detonation shockwave 130. Further, with continuous detonation, the detonation wave 130 propagates around the detonation chamber 122 in a continuous manner, operating at a relatively high frequency. Additionally, the detonation wave 130 may be such that an average pressure inside the detonation chamber 122 is higher than an average pressure within typical combustion systems (i.e., deflagration combustion systems).

Accordingly, the region 134 behind the detonation wave 130 has very high pressures. As will be appreciated from the discussion below, the fuel injector 152 of the RDC system 100 is designed to prevent the high pressures within the region 134 behind the detonation wave 130 from flowing in an upstream direction, i.e., into the incoming flow of the fuel/oxidizer mixture 132.

Referring briefly to FIG. 5, a perspective view of an embodiment of the RDC system 100 is generally provided. The embodiment depicted in regard to FIG. 5 is configured substantially similarly as shown and described in regard to FIGS. 1-4. In FIG. 5, the fuel passage 105 is extended circumferentially and axially (i.e., helically) along the axial direction A and around the centerline axis 117, such as around the detonation chamber 122. In various embodiments, such as described in regard to FIGS. 1-4, at least a portion of the fuel passage 105 is configured to provide the flow of fuel 192 in counter-flow arrangement along the axial direction A relative to the flow of detonation gases 132 through detonation chamber 122. As such, the flow of fuel 192 is provided through the fuel passage 105 toward a first axial direction opposite of the flow of detonation gases 132 along a second axial direction through the detonation chamber 122.

Referring briefly to FIGS. 6-7, embodiments of portions of the RDC system 100 are generally provided. In certain embodiments, the fuel passage 105 may extend forward and aft along the axial direction A. In FIG. 6, the fuel passage 105 may extend at an acute angle relative to the axial direction A, such as helically (e.g., such as depicted in regard to FIG. 5). In FIG. 7, the fuel passage 105 may extend back and forth between the forward end 98 and the aft end 99, such as to provide a serpentine structure. In various embodiments, the RDC system 100 includes an internal wall 121 extended between the first and second outer walls 118, 119, such as to separate the fluid passage 105 between portions extended toward the forward end 98 and the aft end 99, or to separate the fluid passage 105 into two or more passages.

Referring to FIGS. 1-5, during operation of the RDC system 100, liquid and/or gaseous fuel is provided from the fuel system 170 to an aft or downstream end 126 of the RDC system 100 to the fuel passage 105 (i.e., downstream relative to the flow of detonation gases 132 through the detonation chamber 122). The flow of fuel 192 is a heat sink at which thermal energy is transferred from the detonation gases 132 in the detonation chamber 122 through the outer walls 118, 119 to the flow of fuel 192 in the fuel passage 105. Particularly, the flow of fuel 192 is introduced to portions of the outer walls 118, 119 experiencing heat loads that are higher than other portions of the outer walls 118, 119. As the flow of fuel 192 flows toward the forward or upstream end 124 of the RDC system 100 (i.e., upstream relative to the flow of detonation gases 132 through the detonation chamber 122), decreasing magnitudes of thermal energy are transferred to the flow of fuel 192 as the heat load at the outer walls 118, 119 is generally less toward the upstream end 124 in contrast to the downstream end 126.

It should be appreciated that the flow of fuel 192 may provide benefits over other heat sink fluids. In some instances, fuel may have better heat retention capacity over air, oxidizer, or inert gas, such that fuel may improve cooling at the outer walls 118, 119. In still some instances, detonation combustion may be improved by having higher magnitudes of thermal energy or heat in the fuel prior to mixing with compressed air 93 and detonating to form detonation gases 132. In some instances, the heated fuel may require less input energy to excite detonation at the detonation chamber 122. In still some instances, the heated fuel may improve quality of detonation, such as to provide a desired detonation cell width or quantity that may improve sustainability of detonation across the volume of the detonation chamber 122. In various embodiments, the fuel system 170 provides a flow of de-oxygenated fuel to the fuel passage 105, such as to mitigate coking within the fuel passage 105 or fuel injector 152 as the fuel 192 is heated by the outer walls 118, 119.

Referring back to FIGS. 2-5, in certain embodiments, the RDC system 100 may further include a fuel bypass circuit 144 configured to egress at least a portion of the flow of fuel from the fuel passage 105, such as shown schematically via arrows 193. In still certain embodiments, the fuel bypass circuit 144 includes an egress valve 145 configured to selectively allow a portion of the flow of fuel 192 to egress the fuel passage 105 and bypass the fuel injector opening 128, such as depicted via arrows 193, instead of entering the fuel injector 152 and egressing therethrough to the detonation chamber 122, such as depicted via arrows 93. The egress valve 145 may allow for selective control of the temperature of the fuel 93 entering the detonation chamber 122. In some embodiments, the egress valve 145 controls pressure and/or flow rate of fuel through the fuel passage 105, such as to desirably alter an amount of time the flow of fuel 192 is in thermal communication with the outer walls 118, 119.

Referring to FIGS. 1-2, the fuel system 170 includes a heat exchanger configured to receive the portion of the flow of fuel 193 egressed or bypassed from the fuel passage 105. The heat exchanger at the fuel system 170 provides the flow of fuel 193 in thermal communication with a heat sink fluid 182, such as to remove at least a portion of the thermal energy from the flow fuel 193 that was received from the outer walls 118, 119. In certain embodiments, the engine 102 includes a fuel bypass circuit 144 configured to provide fluid communication from the fuel system 170 to the fuel passage 105 at the forward or upstream end 124 of the RDC system 100. For instance, the fuel bypass circuit 144 may be configured to return at least a portion of the flow of fuel that initially bypassed the fuel injector opening 128, depicted schematically via arrows 193, and directed to the heat exchanger at the fuel system 170 in thermal communication with the heat sink fluid 182. The temperature-adjusted flow of fuel, depicted schematically via arrows 195, is egressed from the heat exchanger at the fuel system 170 and returned to the fuel passage 105 proximate to the forward end 124.

It should be appreciated that various embodiments of the fuel system 170 includes valves or other pressure or flow control devices. In certain embodiments, such as depicted in regard to FIG. 1, the engine 102 includes an egress valve 145 positioned to control an amount, pressure, flow rate, or temperature of the flow of fuel 195 that returns to the fuel passage 105 at the forward end 124.

In other embodiments, such as depicted in regard to FIGS. 1, 3 and 5, the RDC system 100 includes a bypass supply valve 143 positioned at a bypass supply conduit 142. The bypass supply conduit 142 is positioned in fluid communication with the fuel passage 105 proximate to the forward end 124 of the RDC system 100. The bypass supply valve 143 is positioned fluidly between the fuel system 170 and the fuel passage 105, such as to provide a flow of fuel that at least partially, or substantially, bypasses the fuel passage 105, such as depicted schematically via arrows 196.

In certain embodiments, the RDC system 100 includes a forward plenum 150 in fluid communication with the fuel passage 105 at or proximate to the forward end 124 of the RDC system 100. Referring briefly to FIG. 5, in various embodiments, the forward plenum 150 is extended at least partially, or substantially, circumferentially around the centerline axis 117. In still certain embodiments, the RDC system 100 includes an aft plenum 160 in fluid communication with the fuel passage 105 at or proximate to the aft end 126 of the RDC system 100. In various embodiments, the aft plenum 160 is extended at least partially, or substantially, circumferentially around the centerline axis 117, such as around the detonation chamber 122. Referring to FIGS. 1-3 and 5, in various embodiments, the forward plenum 150 is configured to collect the flow of fuel 192 from the fuel passage 105, such as to provide a substantially even pressure or temperature distribution of the flow of fuel 192 before egressing the flow of fuel 93 through the fuel injector opening 128. In still various embodiments, the aft plenum 160 is configured to collect the flow of fuel 191 from the fuel system 170, such as to distribute the fuel to one or more fuel passages 105, or to provide a substantially even pressure or temperature distribution of the flow of fuel 191 before entering the fuel passage 105. The substantially even circumferential pressure or temperature distribution of the flow of fuel 191 may allow the flow of fuel 192 at the fuel passage 105 to substantially evenly receive a heat load or heat transfer from the outer walls 118, 119, such as to mitigate circumferential variations in temperature at the outer walls 118, 119.

Referring back to FIGS. 3 and 5 particularly, in certain embodiments, the bypass supply conduit 142 is configured to provide fluid communication between the fuel system 170 and the forward plenum 150. The bypass supply valve 143 is positioned at the bypass supply conduit 142 in fluid communication between the fuel system 170 and the forward plenum 150. The fuel system 170, or particularly the bypass supply valve 143, selectively controls the pressure or flow rate of the flow of fuel 196 entering the forward plenum 150 that bypasses the fuel passage 105 that is mixed with the flow of fuel 192 from the fuel passage 105, such that the flow of fuel 93 egressed to the detonation chamber 122 is of a desired temperature.

In certain embodiments, the flow of fuel 192 through the fuel passage 105 is allowed to receive as much thermal energy from the outer walls 118, 119 as desired for thermal attenuation at the outer walls 118, 119, such as to mitigate structural deterioration, wear, or thermal stress at the outer walls 118, 119. Additionally, the flow of fuel 196 bypassing the fuel passage 105 generally defines a lower temperature than the flow of fuel 192 that receives thermal energy from the outer walls 118, 119. The fuel system 170, or particularly the bypass supply valve 143, selectively allows the cooler flow of fuel 196 that bypasses the fuel passage 105 to be mixed at the forward plenum 150 with the flow of fuel 192 from the fuel passage 105, such as to desirably adjust the temperature of the flow of fuel 93 that is mixed with the compressed air 92 at the detonation chamber 122. The desired adjusting of the temperature of the flow of fuel 93 is based at least in part on a desired operating condition of the RDC system 100 or engine 102 (e.g., the pressure, flow rate and/or temperature of compressed air 92 entering the RDC system 100, a desired output thrust or energy from the detonation gases 132, a desired detonation cell size or quantity based at least on sustaining desired detonation at the detonation chamber 122, or combinations thereof).

Referring back to FIG. 1, in conjunction with FIGS. 2-7, the RDC system 100 further includes a controller configured to adjust, modulate, or otherwise desirably provide fuel or fuel/oxidizer mixtures through the fuel nozzles, separately or in conjunction with two or more fuel nozzles. In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 can include control logic 216 stored in memory 214. The control logic 216 may include instructions that when executed by the one or more processors 212 cause the one or more processors 212 to perform operations, such as steps for operating the RDC system 100 to mitigate thermal stress at the RDC system 100 (e.g., at the outer walls 118, 119) and to provide rotating detonation combustion at the detonation chamber.

Additionally, as shown in FIG. 1, the controller 210 can also include a communications interface module 230. In several embodiments, the communications interface module 230 can include associated electronic circuitry that is used to send and receive data. As such, the communications interface module 230 of the controller 210 can be used to send and/or receive data to/from engine 102 and the RDC system 100. In addition, the communications interface module 230 can also be used to communicate with any other suitable components of the engine 102, including any number of sensors (e.g., sensors 221, 222, 223), valves or flow control devices (e.g., valves 142, 143, 145), orifices, etc. configured to determine, calculate, modify, alternate, articulate, adjust, or otherwise provide a desired fuel characteristic and/or oxidizer characteristic to the detonation chamber 122, including, but not limited to, fluid flow rate, fluid pressure, fluid temperature, fluid density, fluid atomization, etc. It should be appreciated that the communications interface module 230 can be any combination of suitable wired and/or wireless communications interfaces and, thus, can be communicatively coupled to one or more components of the RDC system 100 and engine 102 via a wired and/or wireless connection. As such, the controller 210 may obtain, determine, store, generate, transmit, or operate any one or more steps of a method for operating the RDC system 100 such as described herein, or a system 101, the engine 102, or an apparatus to which the engine 102 is attached (e.g., an aircraft), or a ground, air, or satellite-based apparatus in communication with the RDC system 100, system 101, and/or heat engine 102 (e.g., a distributed network).

Referring back to FIG. 1, in certain embodiments, the RDC system 100 is included as a system 101 for operating a rotating detonation combustion system. The system 101 may provide thermal attenuation at one or more walls defining a detonation chamber, such as shown and described in regard to FIGS. 1-7. The system 101 may further provide a desired fuel characteristic to a flow of fuel that is mixed with oxidizer to provide the detonation wave at the detonation chamber. As described herein, the desired fuel characteristic may include one or more of a fuel temperature, pressure, vapor pressure, flow rate, viscosity, density, atomization, or a desired physical characteristic of the flow of fuel through the RDC system (e.g., the flow of fuel 93 entering the detonation chamber 122). It should be appreciated that various embodiments of the system 101 include a computer system or computer-implemented method, such as including one or more of the controller 210, the valves 143, 145, or the sensors 221, 222, 223 such as further described herein.

Referring back to FIG. 1, the engine 102 may include a first sensor 221 positioned at or proximate to the aft end 126 of the RDC system 100 at the fuel passage 105. The first sensor 221 is configured to obtain, measure, calculate, or otherwise receive and provide a first fuel characteristic of the flow of fuel (e.g., flow of fuel 192) substantially upstream of the fuel passage 105. For instance, the first sensor 221 may be positioned at the aft plenum 160, at the fuel system 170, or at the fuel manifold 140.

The engine 102 may further include a second sensor 222 positioned at or proximate to the forward end 124 of the RDC system 100, or otherwise at a distal end of the fuel passage 105. The second sensor 222 is similarly configured as the first sensor 221 to receive and provide a second fuel characteristic of the flow of fuel substantially downstream of the fuel passage 105. For instance, the second sensor 222 may be positioned at the forward plenum 150 or at the fuel injector 152.

The sensors 221, 222 are communicatively and operably coupled to the controller 210, the valves 143, 145, and the fuel system 170, such as to provide inputs for desirably controlling the fuel characteristics of the flow of fuel 93 entering the detonation chamber 122. During operation of the RDC system 100, the first sensor 221 is configured to receive one or more of a first parameter of the flow of fuel 192, in which the first parameter is the first fuel characteristic. The second sensor 222 is configured to receive one or more of a second parameter of the flow of fuel 192, in which the second parameter is the second fuel characteristic.

In certain embodiments of the engine 102 and the RDC system 100, the controller 210 is configured to receive the first parameter and the second parameter and determine an output fuel characteristic (e.g., fuel flow rate, fuel pressure, fuel temperature, etc.) of the flow of fuel 191 from the fuel system 170. The controller 210 commands a change in the fuel characteristic from the fuel system 170, such that the measured first parameter is adjusted based at least on operating conditions at the detonation chamber 122. Operating conditions at the detonation chamber 122 include a generated heat load, such as based on the compressed air 92 and fuel 93 detonated at the detonation chamber 122. Additionally, or alternatively, the controller 210 commands a change in fuel characteristic from the fuel system 170, such that the measured second parameter is adjusted based on a desired fuel characteristic of the flow of fuel 93 entering the detonation chamber 122. The desired change in the second parameter is based at least in part on a desired detonation cell quantity, size, or other performance factor of the detonation wave 130 at the detonation chamber 122.

In still certain embodiments, the controller 210 is configured to alter an operating position of the bypass supply valve 143, such as to admit or restrict an amount of fuel 195 that is mixed with the heated flow of fuel 192 from the fuel passage 105. The bypass supply valve 143 desirably opens or closes between a range of 0% and 100%, such as to desirably alter the measured second parameter from the second sensor 222. The bypass supply valve 143 may furthermore desirably alter the second parameter substantially independently of altering the first parameter. For instance, the fuel system 170 may provide the flow of fuel 191 at a first characteristic such as to maximize heat transfer to the flow of fuel 192 within the fuel passage 105. Additionally, the bypass supply valve 143 may articulate to provide the flow of fuel 195, defining a lower temperature that the flow of fuel 192 through the fuel passage 105, such as to desirably alter the second characteristic of the flow of fuel egressing the fuel passage 105 and the fuel injector opening 128.

In still various embodiments, the RDC system 100 includes a third sensor 223 configured to receive and provide a third characteristic of the flow of fuel 195 bypassing the fuel passage 105. In various embodiments, the third sensor 223 is positioned at the bypass supply conduit 142, such as to receive a third parameter including the third characteristic of the flow of fuel 195 to be mixed, at least in part, with the flow of fuel 192 from the fuel passage 105. The third sensor 223 may further be in operable communication with the bypass supply valve 143 such as to desirably alter the second parameter including the second characteristic of the flow of fuel 93 egressing fuel injection opening 128.

In another embodiment, the egress valve 145 is configured to bypass at least a portion of the heated flow of fuel 192 from the fuel passage 105 to a heat exchanger at the fuel system 170 based on a desired second characteristic of the flow of fuel 93, such as described herein. As such, one or more of the sensors 221, 222, 223 is operably configured to receive and provide the fuel characteristic such as to determine, at least in part, an amount of the heated flow of fuel 192 that should desirably be bypassed from the fuel injector 152 to the fuel system 170 to transfer at least some thermal energy to the heat sink fluid 182 before returning to the forward plenum 150, such as depicted via arrows 195.

In one embodiment, the sensors 221, 222, 223 are in operable communication with the controller 210. The controller 210 is configured to provide signals to adjust, articulate, change, alter, or otherwise adjust a position of one or more control devices or valves 143, 145 such as to desirably alter one or more fuel characteristics as described herein. In another embodiment, the sensors 221, 222, 223 are directly connected in operable communication with one or more control devices or valves 143, 145, or the fuel system 170 via a control circuit 225, such as to provide signals to adjust the fuel characteristics as described herein.

In various embodiments, the system 101, or RDC system 100, or engine 102, is configured to selectively open the bypass supply valve 143 to mix a second flow of fuel (e.g., flow of fuel 195) with a first flow of fuel (e.g., flow of fuel 192) to generate a desired second parameter including the second characteristic of the flow of fuel 93 exiting the fuel injector opening 128. In certain embodiments, the system is configured to selectively open the bypass supply valve 143 to mix the second flow of fuel with the first flow of fuel when the first flow of fuel is above a first threshold. In various embodiments, the first threshold corresponds to a vapor pressure, maximum desired temperature, or other fuel characteristic of the flow of fuel 192.

In still certain embodiments, the system is configured to selectively close the bypass supply valve 143 to only egress the first flow of fuel (e.g., flow of fuel 192) from the fuel injector opening 128 when the first flow of fuel is below a second threshold. In various embodiments, the second threshold corresponds to a minimum desired temperature of the flow of fuel. The minimum desired temperature may correspond to a minimum condition necessary for detonation combustion, or a desired quality of detonation combustion, at the detonation chamber. The maximum desired temperature may correspond to a maximum allowable heat load or heat transfer to the flow of fuel 192 at the fuel passage 105. The maximum desired temperature may correspond to a fuel coking temperature or other fuel characteristic.

Embodiments shown and described in regard to FIGS. 1-7 may include elements, features, reference numerals, details, or methods for operation shown or described in regard to one figure and not necessarily shown or described in regard to another figure. It should further be appreciated that one or more figures may omit certain features for the sake of clarity. Furthermore, elements, features, reference numerals, details, or descriptions or depictions of method for operation may be distributed across two or figures for the sake of clarity. It should be appreciated that elements, features, reference numerals, details, or methods shown or described in regard to one figure are applicable to any or all other figures provided herein unless otherwise stated. As such, combinations of elements, features, reference numerals, details, or methods shown or described herein in regard to two or more figures may constitute an embodiment within the scope of the present disclosure as if depicted together in a single figure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A rotating detonation combustion system, the system defining an aft end at which detonation gases exit and a forward end at which a flow of oxidizer enters, the RDC system comprising a first outer wall and a second outer wall each extended around a centerline axis; a detonation chamber formed radially inward of the second outer wall; a fuel passage extended between the first outer wall and the second outer wall, wherein the fuel passage comprises a first inlet opening proximate to the aft end through which a flow of fuel is received into the fuel passage, and wherein the flow of fuel is provided through the fuel passage from the aft end to the forward end of the RDC system.

2. The RDC system of any clause herein, wherein the first outer wall and the second outer wall together fluidly separate the flow of fuel from the detonation chamber.

3. The RDC system of any clause herein, comprising a fuel injector in fluid communication with the fuel passage, wherein at least a portion of the flow of fuel egresses the fuel injector into the detonation chamber.

4. The RDC system of any clause herein, wherein the fuel injector is positioned at the forward end of the system.

5. The RDC system of any clause herein, wherein the fuel passage is extended at least partially circumferentially around the centerline axis.

6. The RDC system of any clause herein, wherein the fuel passage is extended helically around the centerline axis.

7. The RDC system of any clause herein, wherein at least a portion of the fuel passage is configured to provide the flow of fuel in counter-flow arrangement relative to a flow of detonation gases in the detonation chamber.

8. The RDC system of any clause herein, comprising a bypass supply valve positioned at the forward end of the RDC system, wherein the bypass supply valve is configured to selectively provide a second flow of fuel to the fuel injector.

10. The RDC system of any clause herein, comprising a forward plenum positioned in serial flow arrangement between the fuel passage and the fuel injector, the forward plenum extended at least partially circumferentially relative to the centerline axis.

11. The RDC system of any clause herein, comprising a fuel bypass circuit in fluid communication with the forward plenum, wherein the fuel bypass circuit is configured to egress at least a portion of the flow of fuel from egressing a fuel injector opening into the detonation chamber.

12. The RDC system of any clause herein, further comprising an egress valve positioned at the fuel bypass circuit, wherein the egress valve is configured to selectively egress the flow of fuel from the forward plenum through the fuel bypass circuit.

13. The RDC system of any clause herein, wherein the first outer wall and the second outer wall together define an aft plenum proximate to the aft end in fluid communication with the first inlet opening, wherein the plenum is extended annularly between the first outer wall and the second outer wall.

14. The RDC system of any clause herein, further comprising an internal wall extended between the first outer wall and the second outer wall, wherein the internal wall is further extended at least partially along the axial direction, and wherein the internal wall separates the fuel passage into two or more fuel passages.

15. The RDC system of any clause herein, wherein the first outer wall defines the first inlet opening therethrough in fluid communication with the fuel passage.

16. A heat engine comprising the RDC of any clause herein, the heat engine comprising a compressor section configured to provide a flow of oxidizer to a rotating detonation combustion (RDC) system; the rotating detonation combustion (RDC) system defining an aft end at which detonation gases exit a detonation chamber and a forward end at which the flow of oxidizer enters the detonation chamber, the RDC system comprising a first outer wall and a second outer wall each extended around a centerline axis; wherein the detonation chamber is formed radially inward of the second outer wall; wherein a fuel passage is extended between the first outer wall and the second outer wall, the fuel passage comprising a first inlet opening proximate to the aft end through which a flow of fuel is received into the fuel passage, and wherein the flow of fuel is provided through the fuel passage from the aft end to the forward end of the RDC system; and a fuel injector positioned at the forward end of the RDC system in fluid communication with the fuel passage and the detonation chamber.

17. The heat engine any clause herein, comprising a bypass supply valve positioned at the forward end of the RDC system; and a control circuit, the control circuit comprising a first sensor configured to receive one or more of a first parameter of the first flow of fuel; and a second sensor configured to receive one or more of a second parameter of the second flow of fuel, wherein the control circuit provides the first parameter and the second parameter to the bypass supply valve, the bypass supply valve configured to selectively provide the second flow of fuel to the fuel injector based at least on the first parameter and the second parameter.

18. The heat engine of any clause herein, wherein the first parameter and the second parameter each correspond to a temperature of the respective flows of fuel.

19. The heat engine of any clause herein, wherein the control circuit is configured to selectively open the bypass supply valve to mix the second flow of fuel with the first flow of fuel to generate a third parameter corresponding to a flow of fuel egressed from the fuel injector.

20. The heat engine of any clause herein, wherein the control circuit is configured to selectively open the bypass supply valve to mix the second flow of fuel with the first flow of fuel when the first flow of fuel is above a first threshold.

21. The heat engine of any clause herein, wherein the first threshold corresponds to a vapor pressure of the flow of fuel.

22. The heat engine of any clause herein, wherein the first threshold corresponds to a maximum desired temperature of the flow of fuel.

23. The heat engine of any clause herein, wherein the control circuit is configured to selectively close the bypass supply valve to only egress the first flow of fuel from the fuel injector when the first flow of fuel is below a second threshold.

24. The heat engine of any clause herein, wherein the second threshold corresponds to a minimum desired temperature of the flow of fuel.

25. The heat engine of any clause herein, wherein the control circuit comprises a controller, the controller comprising one or more processors and one or more memory, the one or more memory configured to store instructions.

26. A computer system for operating a rotating detonation combustion system of any preceding clause.

27. A propulsion system comprising the RDC system of any preceding clause.

28. A method for operating a rotating detonation combustion system, the method comprising one or more operations of the controller of any preceding claim.

What is claimed is:

1. A rotating detonation combustion (RDC) system, the system defining an aft end at which detonation gases exit and a forward end at which a flow of oxidizer enters, the RDC system comprising:
    a first outer wall and a second outer wall each extended around a centerline axis;
    a detonation chamber formed radially inward of the second outer wall;
    a fuel passage extended between the first outer wall and the second outer wall, wherein the fuel passage comprises a first inlet opening proximate to the aft end through which a flow of fuel is received into the fuel passage, and wherein the flow of fuel is provided through the fuel passage from the aft end to the forward end of the RDC system;
    a forward plenum positioned in serial flow arrangement between the fuel passage and a fuel injector in fluid communication with the fuel passage, the forward plenum extended at least partially circumferentially relative to the centerline axis;
    a fuel bypass circuit in fluid communication with the forward plenum, wherein the fuel bypass circuit is configured to egress at least a portion of the flow of fuel from egressing the fuel injector opening into the detonation chamber; and
    an egress valve positioned at the fuel bypass circuit, wherein the egress valve is configured to selectively egress the flow of fuel from the forward plenum through the fuel bypass circuit.

2. The RDC system of claim 1, wherein the first outer wall and the second outer wall together fluidly separate the flow of fuel from the detonation chamber.

3. The RDC system of claim 1, wherein at least a portion of a flow of fuel egresses from the fuel passage through the fuel injector into the detonation chamber.

4. The RDC system of claim 3, wherein the fuel injector is positioned at the forward end of the system.

5. The RDC system of claim 1, wherein the fuel passage is extended at least partially circumferentially around the centerline axis.

6. The RDC system of claim 1, wherein the fuel passage is extended helically around the centerline axis.

7. The RDC system of claim 1, wherein at least a portion of the fuel passage is configured to provide the flow of fuel in counter-flow arrangement relative to a flow of detonation gases in the detonation chamber.

8. The RDC system of claim 1, comprising:
    a bypass supply valve positioned at the forward end of the RDC system, wherein the bypass supply valve is configured to selectively provide a second flow of fuel to the fuel injector.

9. The RDC system of claim 1, wherein the first outer wall and the second outer wall together define an aft plenum proximate to the aft end in fluid communication with the first inlet opening, wherein the aft plenum is extended annularly between the first outer wall and the second outer wall.

10. The RDC system of claim 9, further comprising an internal wall extended between the first outer wall and the second outer wall, wherein the internal wall is further extended at least partially along a axial direction, and wherein the internal wall separates the fuel passage into two or more fuel passages.

11. The RDC system of claim 1, wherein the first outer wall defines the first inlet opening therethrough in fluid communication with the fuel passage.

12. A heat engine, the heat engine comprising:
a compressor section configured to provide a flow of oxidizer to a rotating detonation combustion (RDC) system;
the RDC system defining an aft end at which detonation gases exit a detonation chamber and a forward end at which the flow of oxidizer enters the detonation chamber, the RDC system comprising a first outer wall and a second outer wall each extended around a centerline axis;
wherein the detonation chamber is formed radially inward of the second outer wall;
wherein a fuel passage is extended between the first outer wall and the second outer wall, the fuel passage comprising a first inlet opening proximate to the aft end through which a flow of fuel is received into the fuel passage, and wherein the flow of fuel is provided through the fuel passage from the aft end to the forward end of the RDC system;
a fuel injector positioned at the forward end of the RDC system in fluid communication with the fuel passage and the detonation chamber;
a bypass supply valve positioned at the forward end of the RDC system; and
a control circuit, the control circuit comprising:
a first sensor configured to receive one or more of a first parameter of a first flow of fuel; and
a second sensor configured to receive one or more of a second parameter of a second flow of fuel, wherein the control circuit provides the first parameter and the second parameter to the bypass supply valve, the bypass supply valve configured to selectively provide the second flow of fuel to the fuel injector based at least on the first parameter and the second parameter.

13. The heat engine of claim 12, wherein the control circuit is configured to selectively open the bypass supply valve to mix the second flow of fuel with the first flow of fuel to generate a third parameter corresponding to the flow of fuel egressed from the fuel injector.

14. The heat engine of claim 12, wherein the control circuit is configured to selectively open the bypass supply valve to mix the second flow of fuel with the first flow of fuel when the first flow of fuel is above a first threshold.

15. The heat engine of claim 12, wherein the control circuit is configured to selectively close the bypass supply valve to only egress the first flow of fuel from the fuel injector when the first flow of fuel is below a second threshold.

* * * * *